US007068649B2

(12) United States Patent
Fisher et al.

(10) Patent No.: US 7,068,649 B2
(45) Date of Patent: Jun. 27, 2006

(54) EXTENDED BANDWIDTH HOMEPNA SYSTEM COMPATIBLE WITH HOMEPNA 2.0

(75) Inventors: Kevin Fisher, Nevada City, CA (US); Scott A. Lery, Nevada City, CA (US); Andrew L. Norrell, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 1011 days.

(21) Appl. No.: 09/922,385

(22) Filed: Aug. 3, 2001

(65) Prior Publication Data

US 2002/0015404 A1 Feb. 7, 2002

Related U.S. Application Data

(60) Provisional application No. 60/223,073, filed on Aug. 4, 2000, provisional application No. 60/223,286, filed on Aug. 3, 2000.

(51) Int. Cl.
*H04L 12/66* (2006.01)

(52) U.S. Cl. .................. 370/355; 379/93.06; 714/755; 375/360

(58) Field of Classification Search ................ 370/527, 370/528; 375/222, 377, 295, 230
See application file for complete search history.

(56) References Cited

U.S. PATENT DOCUMENTS

| | | | | |
|---|---|---|---|---|
| 5,377,230 | A | 12/1994 | Golden | ................. 375/60 |
| 6,285,754 | B1 | 9/2001 | Sun et al. | .................. 319/399 |
| 6,329,937 | B1 * | 12/2001 | Harman | .................. 341/118 |
| 6,732,315 | B1 * | 5/2004 | Yagil et al. | .................. 714/755 |
| 6,868,072 | B1 * | 3/2005 | Lin et al. | .................. 370/276 |
| 6,922,407 | B1 * | 7/2005 | Wu | .................. 370/355 |
| 2002/0003835 | A1 * | 1/2002 | Wu | .................. 375/219 |
| 2002/0019966 | A1 * | 2/2002 | Yagil et al. | .................. 714/752 |

OTHER PUBLICATIONS

PCT Written Opinion, International Application No. PCT/US01/24269, International Filing Date Aug. 3, 2001, mailed Jun. 26, 2002.
PCT Notification of Transmittal of International Preliminary Examination Report, International Application No. PCT/US01/24269, International Filing Date Aug. 3, 2001, mailed Dec. 12, 2002.

* cited by examiner

*Primary Examiner*—Seema S. Rao
*Assistant Examiner*—Michael J. Moore
(74) *Attorney, Agent, or Firm*—Blakely, Sokoloff, Taylor & Zafman LLP

(57) ABSTRACT

An extended bandwidth HomePNA system uses a transmit spectrum having a greater bandwidth than the bandwidth specified by a HomePNA 2.0 communication standard. The extended bandwidth system of the invention provides for additional copies of a spectrum of a 2 Mbaud training signal for better accuracy in decoding transmitted data by a receiver. In one embodiment, the extended bandwidth is a 12 MHz band centered at 10 MHz, from 4 MHz to 16 MHz. This extended bandwidth allows for three copies of a 4 Mbaud training sequence or six copies of a 2 Mbaud training sequence. The extended bandwidth of the invention is compatible with a HomePNA 2.0 system by providing a training sequence that enables a HomePNA 2.0 receiver in 2 Mbaud mode to train on the transmitted signal and determine that the transmitted signal is not intended for the HomePNA 2.0 receiver in 2 Mbaud mode.

19 Claims, 6 Drawing Sheets

EXTENDED BANDWIDTH HOMEPNA SYSTEM COMPATIBLE WITH HOMEPNA 2.0

CROSS-REFERENCE TO RELATED APPLICATIONS

This application is related to, and claims the benefit of, U.S. Provisional Patent Application No. 60/223,286, entitled "Extended Bandwidth HPNA System," filed Aug. 3, 2000, and U.S. Provisional Patent Application No. 60/223,073, entitled "Extended Bandwidth HPNA System Compatible with HPNA 2.0," filed Aug. 4, 2000. The subject matter of the related applications is hereby incorporated by reference.

BACKGROUND OF THE INVENTION

1. Field of the Invention

This invention relates generally to electronic communication networks and more particularly to an extended bandwidth HomePNA system compatible with HomePNA 2.0.

2. Description of the Background Art

One type of electronic communication network is described in the HomePhoneline Networking Alliance (HomePNA) 2.0 version 2.02.7 specification, which is hereby incorporated by reference. HomePNA 2.0 specifies data rates from 1 Million bits per second (Mbps) to 32 Million bits per second (Mbps), where a transmitted signal occupies a 6 MHz wide spectrum centered at a carrier frequency of 7 MHz. Although the specified data rates have a maximum of 32 Mbps, typical consumer HomePNA devices do not achieve data rates above 16 Mbps. This reduction in data rates is due to cost constraints in designing and manufacturing consumer HomePNA devices, the electrical characteristics of typical home telephone network wiring, and interference caused by the presence of Amateur Radio signals at frequencies of 4, 7, 10, and 14 MHz.

To achieve data rates above 16 Mbps, the baud rate of a HomePNA 2.0 transmitter must increase from 2 Million symbols per second (Mbaud) to 4 Million symbols per second (Mbaud). In a HomePNA 2.0 system, a doubling of the baud rate (2 Mbaud to 4 Mbaud) does not typically result in a doubling of the data rate. Often a doubling of the baud rate results in a decrease in the data rate.

For many data transfers, a data rate of 16 Mbps provides adequate performance. However, other types of data transfers, for example real-time video transfers (i.e., video-on-demand), require data rates higher than 16 Mbps to provide adequate performance. Thus, a HomePNA 2.0 communication system would not be suitable for data transfers that require data rates higher than 16 Mbps. And yet HomePNA-based networks remain a practical and economical solution for most consumers, since a HomePNA network uses existing telephone wiring in a home or office to connect multiple end user devices.

SUMMARY OF THE INVENTION

In accordance with the invention, an extended bandwidth HomePNA system includes a transmitter configured to transmit an extended bandwidth signal, the extended bandwidth signal having a bandwidth greater than the bandwidth of a signal that conforms to the bandwidth limitations of a HomePNA 2.0 standard. In one embodiment, the extended bandwidth signal has a bandwidth of 12 MHz, which is centered at 10 MHz and spans a frequency range from 4 MHz to 16 MHz. The 12 MHz bandwidth provides sufficient bandwidth for the extended bandwidth signal to include three copies of a spectrum of a 4 Mbaud sequence.

For compatibility with HomePNA 2.0, the extended bandwidth HomePNA system of the present invention produces a training sequence that a HomePNA 2.0 receiver is able to train on and then determine that the incoming packet is not intended for the HomePNA 2.0 receiver. The training sequence of the invention is produced by zero-padding a 2 Mbaud symbol sequence to an 8 Mbaud symbol sequence, modulating the 8 Mbaud sequence by 1 MHz, pulse-shape filtering the modulated sequence to produce a signal with a 12 MHz wide complex baseband spectrum, and then modulating the filtered sequence by 10 MHz to produce the training sequence with a 12 MHz spectrum centered at 10 MHz. The portion of the training sequence from 4 MHz to 10 MHz is identical to a HomePNA 2.0 training sequence. Thus a HomePNA 2.0 receiver is able to train on the training sequence of the invention.

DETAILED DESCRIPTION OF THE DRAWINGS

Figure 1A:
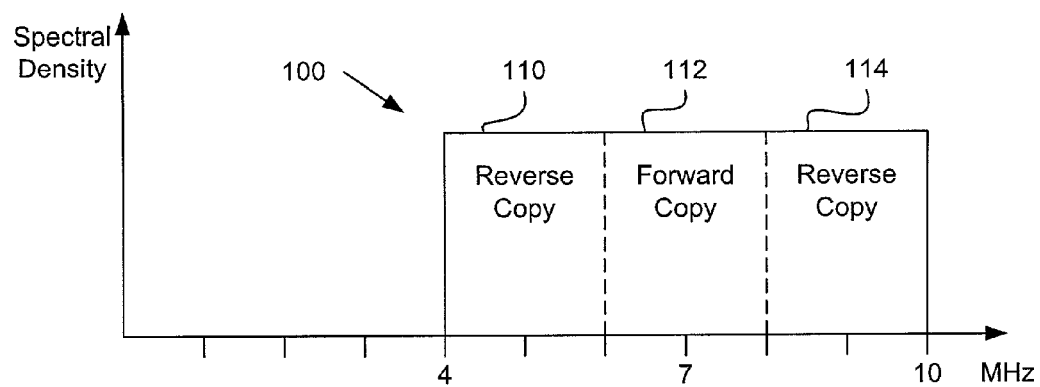
FIG. 1A is a diagram of a transmit spectrum of a prior art communication system.

FIG. 1A is a diagram of one embodiment of a transmit spectrum 100 of a prior art communication system. For simplicity, spectrum 100 is shown as a rectangle; however, spectrum 100 may have any appropriate shape. Transmit spectrum 100 contains the spectral content of a 2 Mbaud HomePNA 2.0 transmit signal. Spectrum 100 has a bandwidth of 6 MHz, from 4 MHz to 10 MHz, centered on a carrier frequency of 7 MHz. As shown in FIG. 1A, spectrum 100 includes three copies of a spectrum of a 2 Mbaud signal: a forward copy 112 and two reverse copies 110 and 114. A HomePNA 2.0 receiver takes advantage of these multiple copies of the signal by coherently combining the copies, which allows the HomePNA 2.0 communication system to communicate at higher data rates.

Figure 1B:
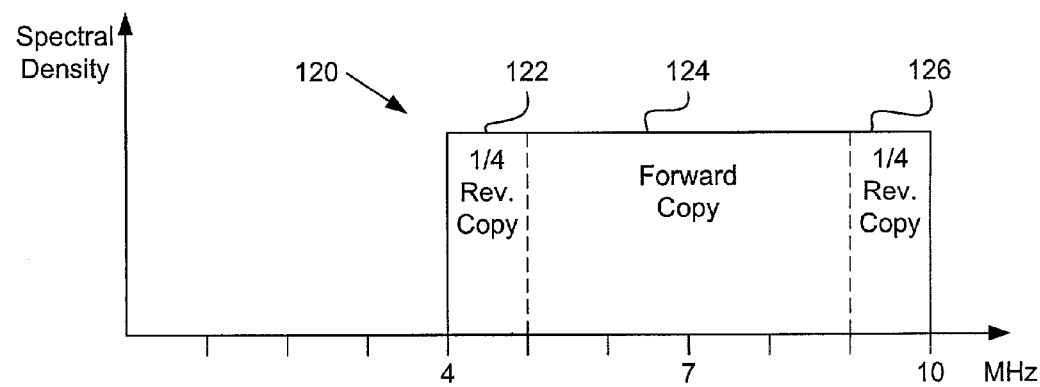
FIG. 1B is a diagram of another transmit spectrum of the prior art communication system.

FIG. 1B is a diagram of another embodiment of a transmit spectrum 120 of a prior art communication system. For simplicity, spectrum 120 is shown as a rectangle; however, spectrum 120 may have any appropriate shape. Transmit spectrum 120 contains the spectral content of a 4 Mbaud HomePNA 2.0 transmit signal. Spectrum 120 has a bandwidth of 6 MHz, from 4 MHz to 10 MHz, centered at a carrier frequency of 7 MHz. As shown in FIG. 1B, spectrum 120 includes one and a half copies of a spectrum of a 4 Mbaud transmit signal: a forward copy 124 and two onequarter reverse copies 122 and 126. The 4 Mbaud signal with spectrum 120 contains half as many copies as the 2 Mbaud signal with spectrum 100.

A HomePNA receiver takes advantage of the spectral redundancies in both the 2 Mbaud mode and the 4 Mbaud mode. The receiver adjusts its equalizer coefficients to constructively add the three copies (in 2 Mbaud mode) or 1.5 copies (in 4 Mbaud mode) of the signal spectrum together to form one usable copy to decode the transmitted data sequence. HomePNA communication channels, such as home telephone wiring, can have serious adverse affects upon transmitted signals, so the spectral redundancy is often essential to effectively recover data at high transmission rates. Since the 2 Mbaud mode has twice as much spectral redundancy as the 4 Mbaud mode, the 2 Mbaud mode of an HomePNA 2.0 system is much more robust than the 4 Mbaud mode.

Figure 2:
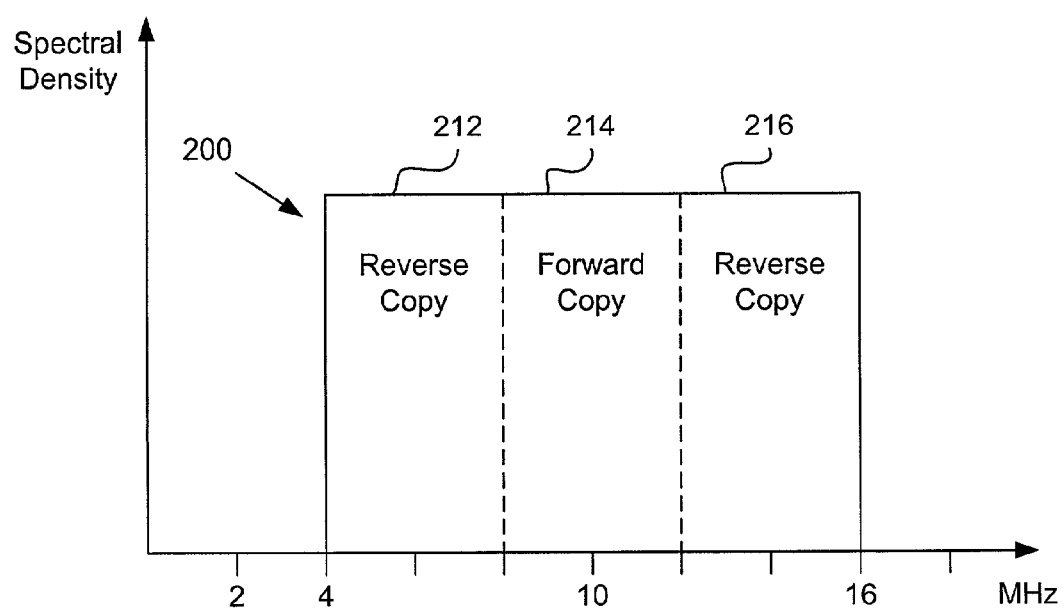
FIG. 2 is a diagram of a transmit spectrum in accordance with one embodiment of the invention.

FIG. 2 is a diagram of a transmit spectrum 200 according to one embodiment of the invention. Spectrum 200 represents the spectral content of a 4 Mbaud signal generated by an extended bandwidth HomePNA system, in accordance with the invention. For simplicity, spectrum 200 is shown as a rectangle; however, spectrum 200 may have any appropriate shape. In the FIG. 2 embodiment, spectrum 200 has a bandwidth of 12 MHz, from 4 MHz to 16 MHz, centered at a carrier frequency of 10 MHz. Spectrum 200 includes three copies of a spectrum of a 4 Mbaud signal: a forward copy 214 and two reverse copies 212 and 216. Spectrum 200 provides three copies of the spectrum of the 4 Mbaud signal, thus allowing a receiver to combine the three copies to achieve a higher data rate than that achieved when transmitting a HomePNA 2.0 4 Mbaud signal.

The extended bandwidth HomePNA system of the invention extends the upper band edge of the transmit bandwidth to 16 MHz, increasing the total bandwidth to 12 MHz, which is double the bandwidth of the HomePNA 2.0 system. The HomePNA system of the invention uses a carrier frequency of 10 MHz. Increasing the bandwidth allows for three 4 MHz wide copies of a 4 Mbaud signal to be sent to a receiver. The bandwidth of 12 MHz shown in FIG. 2 is one embodiment of the extended bandwidth HomePNA system of the invention. Other extended bandwidths, for example 24 MHz, that occupy frequencies allocated to home networking applications are within the scope of the invention.

To be most practicable, the extended bandwidth HomePNA system of the invention needs to be compatible with the HomePNA 2.0 2 Mbaud mode, particularly while a receiver is training. A HomePNA 2.0 receiver should be able to train on a 4 Mbaud packet of the invention and to determine that the packet is not intended for the HomePNA 2.0 receiver. A training sequence that provides this functionality is discussed below in conjunction with FIGS. 3–6.

Figure 3A:
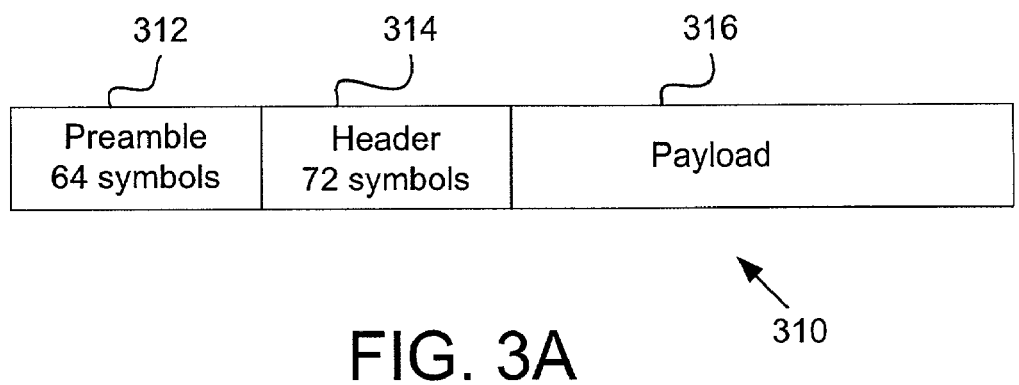
FIG. 3A is a diagram of one embodiment of an HPNA 2.0 packet including a preamble and a header.

FIG. 3A is a diagram of one embodiment of an HPNA 2.0 packet 310 including a preamble 312 and a header 314. In the FIG. 3A embodiment, preamble 312 includes 64 symbols, header 314 includes 72 symbols, and a payload 316 includes the remaining symbols of packet 310. The symbols of preamble 312 are known to the HomePNA 2.0 receiver. The symbols of packet 310 are at a 2 Mbaud rate. To produce spectral redundancy, the symbols of packet 310 are zero-padded, although other methods of producing spectral redundancy are within the scope of the invention.

Figure 3B:
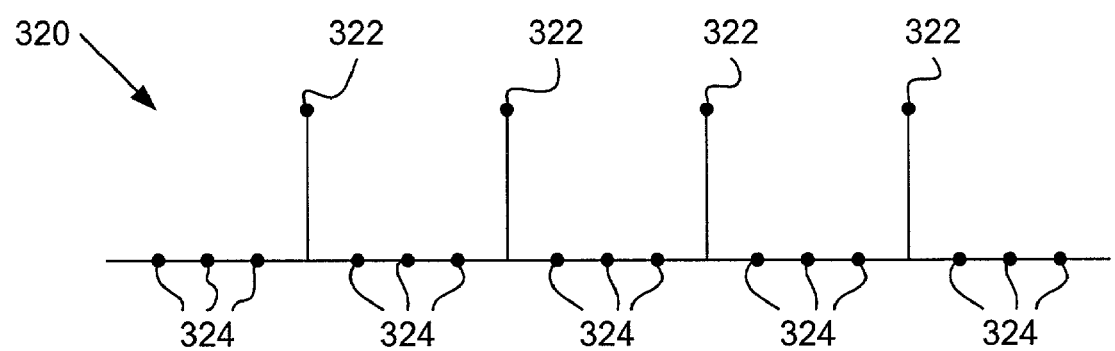
FIG. 3B is a diagram illustrating one embodiment of zero-padding of a symbol stream.

FIG. 3B is a diagram illustrating one embodiment of zero-padding of a symbol sequence 320. Symbol sequence 320 represents several symbols 322 of 2 Mbaud packet 310. Symbol sequence 320 is not meant to represent particular values of symbols of packet 310. To produce a 4 Mbaud training sequence in accordance with the invention, the symbols of packet 310 are zero-padded to an 8 Mbaud sequence by inserting three zeros 324 after each symbol 322 in the 2 Mbaud sequence. The zero-padded sequence is then filtered to produce an 8 Mbaud sequence with a complex baseband spectrum from −6 MHz to 6 MHz.

Figure 4:
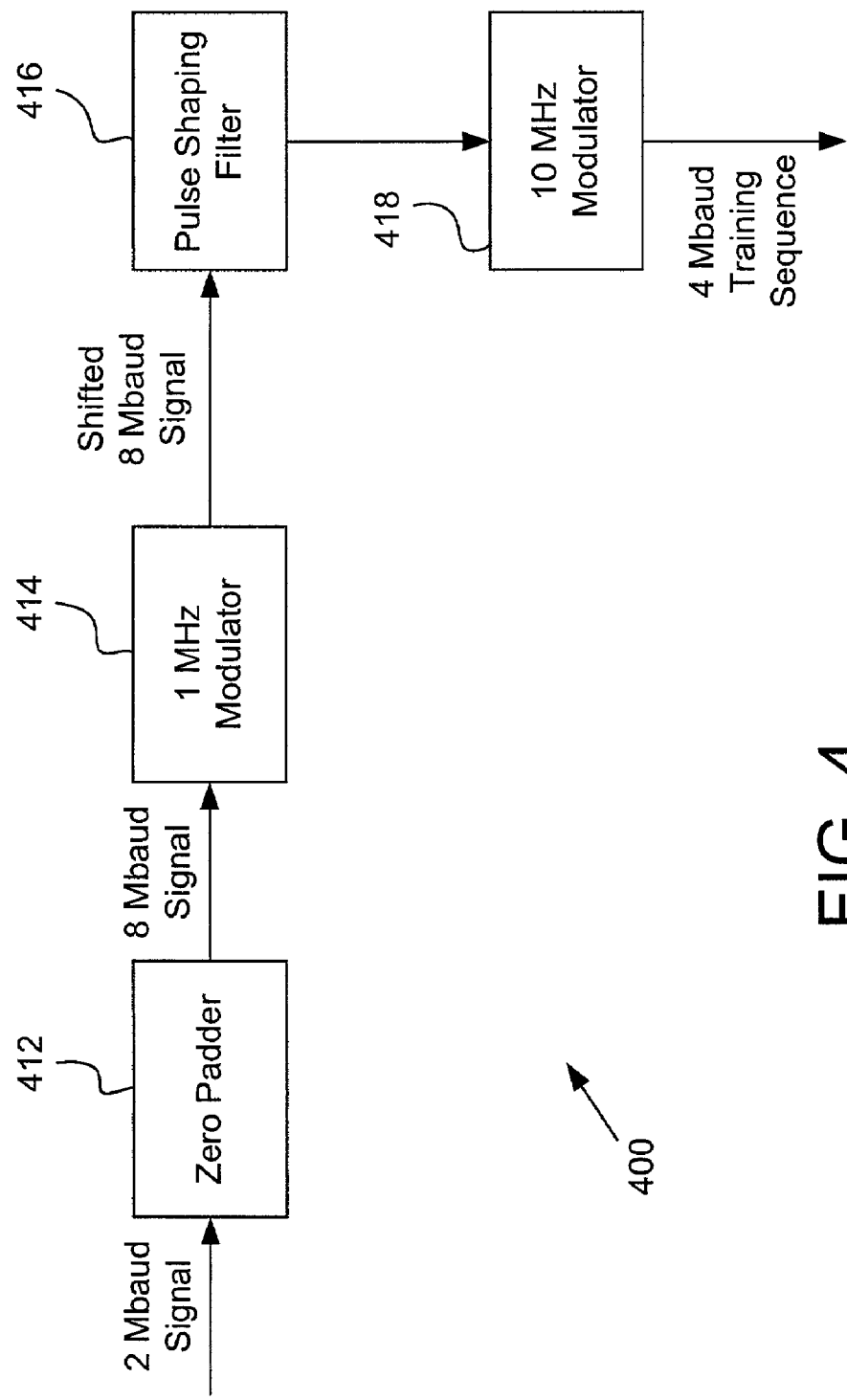
FIG. 4 is a block diagram of one embodiment of a system for generating a 4 Mbaud training sequence, in accordance with the invention.

FIG. 4 is a block diagram of one embodiment of a system 400 for generating a 4 Mbaud training sequence, in accordance with the invention. System 400 is implemented in a transmitter of the extended bandwidth HomePNA system of the invention. System 400 includes, but is not limited to, a zero-padder 412, a 1 MHz modulator 414, a pulse-shaping filter 416, and a 10 MHz modulator 418. Data to be transmitted are coded as complex symbols by an encoder (not shown). The encoder then assembles 2 Mbaud packets, such as packet 310 of FIG. 3A, each including preamble 312 and header 314.

The 2 Mbaud signal (including 2 Mbaud packets) is then input to zero-padder 412, which zero-pads the 2 Mbaud signal to an 8 Mbaud signal by inserting three zeros after each symbol, as described above in conjunction with FIG. 3B. Zero-padder 412 then sends the 8 Mbaud signal to 1 MHz modulator 414, which modulates the 8 Mbaud signal with a 1 MHz carrier signal. Modulating the 8 Mbaud signal by a 1 MHz signal shifts the spectrum of the 8 Mbaud signal to the right by 1 MHz. The purpose of 1 MHz modulator 414 is discussed below in conjunction with FIGS. 5A & 5B.

1 MHz modulator 414 sends the shifted 8 Mbaud signal to pulse-shaping filter 416, which filters the shifted 8 Mbaud signal such that the filtered signal is a complex baseband signal with a spectrum from −6 MHz to 6 MHz, centered at 0 MHz. 10 MHz modulator 418 modulates the complex baseband signal with a 10 MHz carrier signal to produce a 4 Mbaud training sequence having a spectrum from 4 MHz to 16 MHz centered at 10 MHz. The complex symbols of the 4 Mbaud training sequence are then further processed prior to being transmitted by the extended bandwidth HomePNA transmitter of the invention.

Figure 5A:
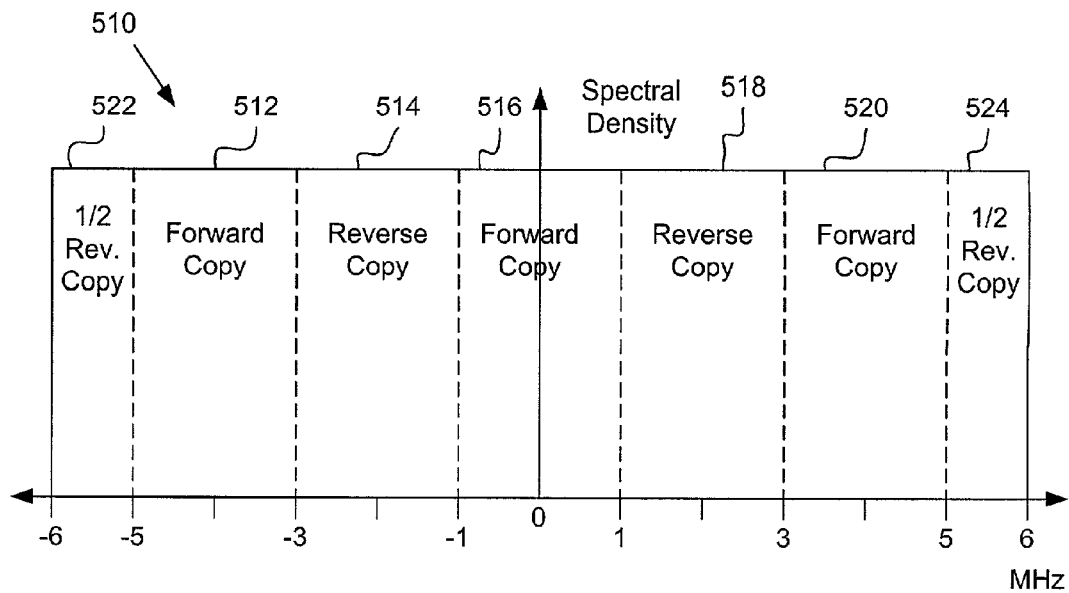
FIG. 5A is a diagram of one embodiment of a transmit spectrum.

FIG. 5A is a diagram of one embodiment of a transmit spectrum 510. Spectrum 510 represents the spectral content of a 2 Mbaud signal zero-padded to an 8 Mbaud signal and pulse shaped to have a spectrum from −6 MHz to 6 MHz. As shown in FIG. 5A, spectrum 510 includes several copies of the spectrum of the 2 Mbaud signal. Specifically, spectrum 510 includes three forward copies 512, 516, and 520, and three reverse copies 514, 518, and 522 & 524 of the spectrum of the 2 Mbaud signal. One of the reverse copies is split into two halves, with one half 522 spanning −6 MHz to −5 MHz and another half 524 spanning 5 MHz to 6 MHz.

If the 8 Mbaud signal represented by spectrum 510 is modulated by a 10 MHz carrier signal, forward copy 512 will span 5 MHz to 7 MHz. A HomePNA 2.0 receiver expects to see such a forward copy in the frequency band of 6 MHz to 8 MHz. Thus the 8 Mbaud signal having spectrum 510 would not be compatible with the HomePNA 2.0 receiver. However, this incompatiblity is resolved in the invention by modulating the 8 Mbaud signal by 1 MHz prior to pulse shaping.

Figure 5B:
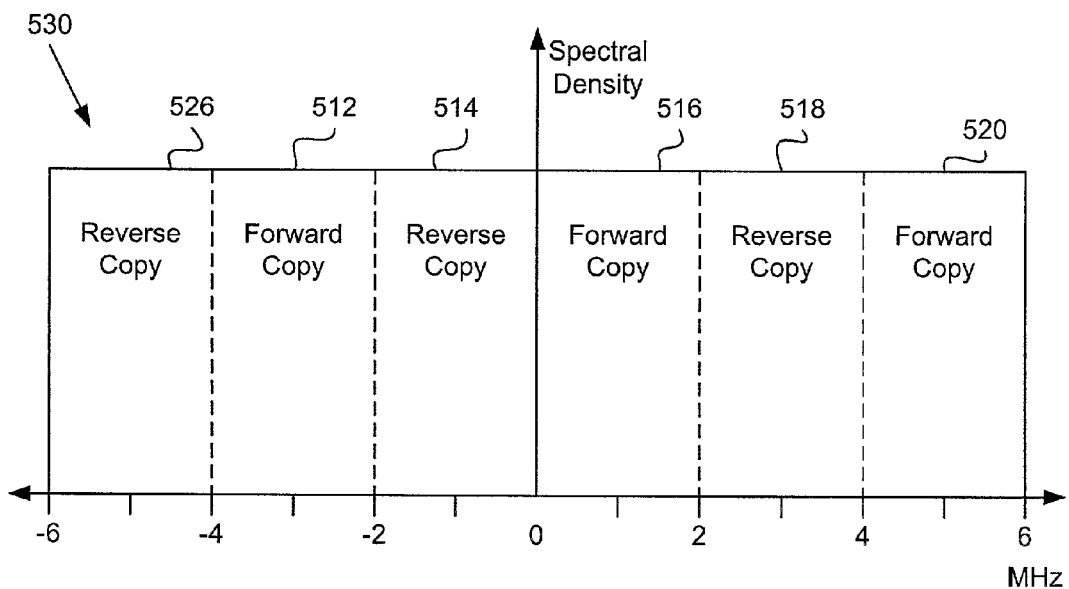
FIG. 5B is a diagram of another embodiment of a transmit spectrum.

FIG. 5B is a diagram of another embodiment of a transmit spectrum 530 according to the invention, which represents the spectral content of the filtered 8 Mbaud signal output by pulse-shaping filter 416 of FIG. 4. As shown in FIG. 5B, spectrum 530 includes three forward copies 512, 516, and 520 of the 2 Mbaud signal, and three reverse copies 514, 518, and 526 of the 2 Mbaud signal. By modulating the 8 Mbaud signal by 1 MHz, spectrum 530 does not include any partial copies of the spectrum of the 2 Mbaud signal.

Figure 6:
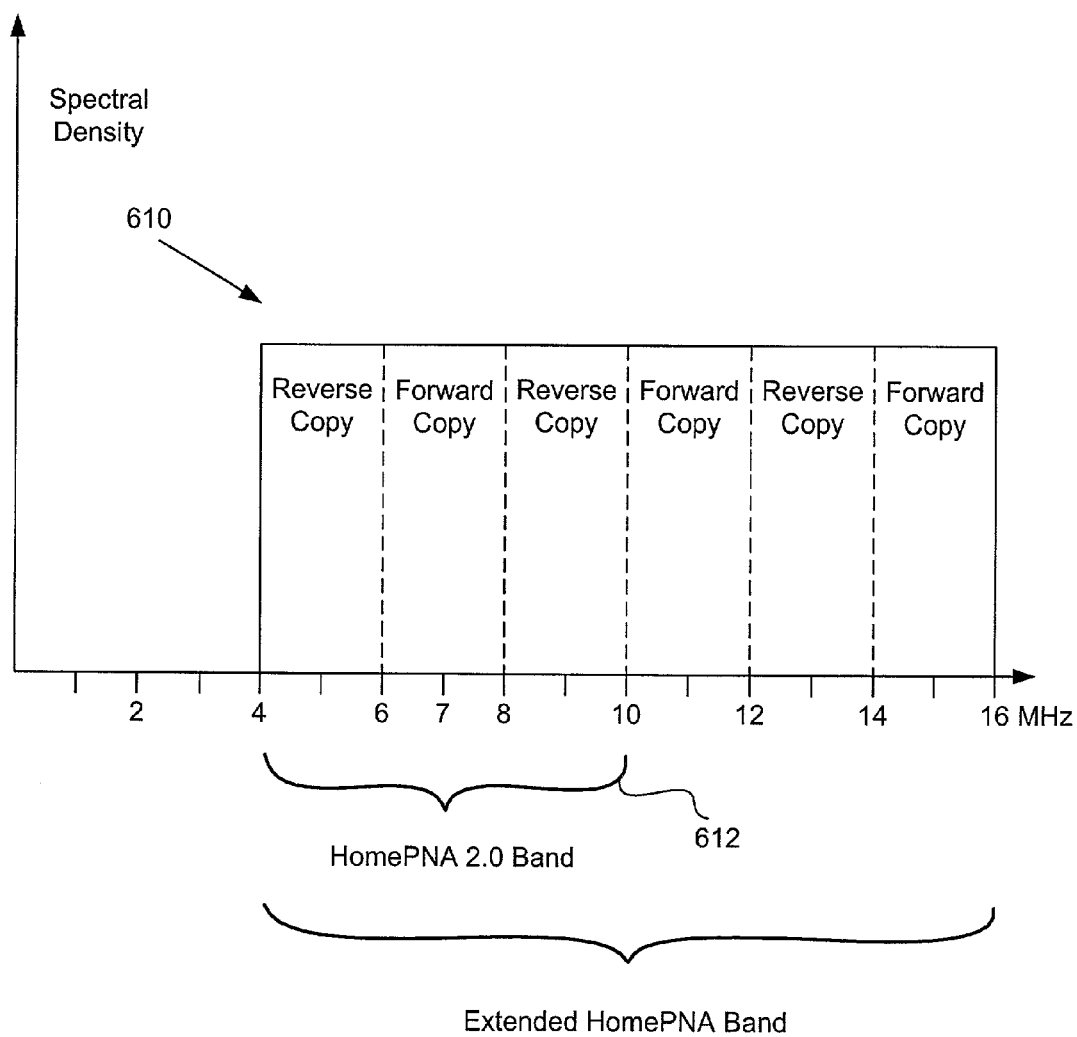
FIG. 6 is a diagram of one embodiment of an extended bandwidth transmit spectrum, according to the invention.

FIG. 6 is a diagram of one embodiment of an extended bandwidth transmit spectrum 610, according to the invention. Spectrum 610 is spectrum 530 of FIG. 5B modulated by a 10 MHz carrier signal. Spectrum 610 represents the spectral content of the 4 Mbaud training signal output by 10 MHz modulator 418 of FIG. 4. Spectrum 610 has a bandwidth of 12 MHz and occupies frequencies from 4 MHz to 16 MHz. Half of spectrum 610 occupies a frequency band from 4 MHz to 10 MHz, which is the HPNA 2.0 band 612. This half of spectrum 610 is identical to spectrum 100 of a HomePNA 2.0 2 Mbaud signal, shown in FIG. 1A. Thus, a HomePNA 2.0 receiver will be able to train on the 4 Mbaud training signal represented by spectrum 610, and will be able to determine that the packet is not intended for a HomePNA 2.0 receiver in 2 Mbaud mode. An extended bandwidth HomePNA receiver in accordance with the invention will be able to train on the 4 Mbaud training signal represented by spectrum 610, and will be able to decode the packet to recover the data, using the multiple copies of the spectrum of the 2 Mbaud signal to improve the accuracy of the decoding process.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. An extended bandwidth HomePhoneline Network Alliance system, comprising:
 a transmitter configured to transmit an extended bandwidth signal, the extended bandwidth signal having a bandwidth greater than a bandwidth of a signal that conforms to the bandwidth limitations of a HomePhoneline Networking Alliance 2.0 specification, wherein the bandwidth of the extended bandwidth signal includes more than one and one half copies of a spectrum of a 4 Million symbols per second (Mbaud) signal.

2. The system of claim 1, wherein the extended bandwidth signal has a bandwidth of 12 MHz.

3. The system of claim 2, wherein the 12 MHz bandwidth of the extended bandwidth signal spans the frequencies from 4 MHz to 16 MHz.

4. The system of claim 1, wherein the bandwidth of the extended bandwidth signal is greater than 6 MHz.

5. The system of claim 1, wherein the bandwidth of the extended bandwidth signal includes three copies of a spectrum of a 4 Million symbols per second (Mbaud) signal.

6. The system of claim 1, wherein the bandwidth of the extended bandwidth signal includes more than three copies of a spectrum of a 2 Million symbols per second (Mbaud) signal.

7. The system of claim 1, wherein the bandwidth of the extended bandwidth signal includes six copies of a spectrum of a 2 Million symbols per second (Mbaud) signal.

8. The system of claim 1, wherein the spectral content of the extended bandwidth signal is such that a HomePhoneline Networking Alliance (HomePNA) 2.0 receiver in 2 Mbaud mode is able to train on the extended bandwidth signal and determine that the extended bandwidth signal is not intended for the HomePNA 2.0 receiver in 2 Mbaud mode.

9. The system of claim 1, further comprising a transmission medium and a receiver configured to receive the extended bandwidth signal from the transmitter via the transmission medium.

10. The system of claim 9, wherein the receiver is further configured to train on the extended bandwidth signal and to decode the extended bandwidth signal to recover data included in the extended bandwidth signal.

11. The system of claim 1, wherein the transmitter includes a module configured to upsample a 2 Mbaud signal to an 8 Mbaud signal, a 1 MHz modulator configured to modulate the 8 Mbaud signal with a 1 MHz signal, a pulse shaping filter configured to filter the output of the 1 MHz modulator such that the filtered signal has a 12 MHz wide baseband spectrum, and a 10 MHz modulator configured to modulate the filtered signal by a 10 MHz carrier signal.

12. The system of claim 11, wherein the module configured to upsample the 2 Mbaud signal to the 8 Mbaud signal is a zero-padder.

13. An extended bandwidth HomePNA system, comprising:
 means for generating an extended bandwidth signal, the extended bandwidth signal having a bandwidth greater than a bandwidth of a signal the conforms to a HomePhoneline Networking Alliance 2.0 specification, wherein the bandwidth of the extended bandwidth signal includes more than one and one half copies of a spectrum of a 4 Million symbols per second (Mbaud) signal.

14. A method for generating a training sequence for training a receiver, comprising the steps of:
 upsampling a 2 Mbaud signal to an 8 Mbaud signal;
 modulating the 8 Mbaud signal with a 1 MHz signal;
 filtering the modulated 8 Mbaud signal to produce a filtered signal having a 12 MHz wide baseband spectrum; and
 modulating the filtered signal with a 10 MHz carrier signal to produce the training sequence.

15. The method of claim 14, wherein the step of upsampling includes inserting three zeros after each symbol in the 2 Mbaud sequence.

16. The method of claim 14, wherein the receiver is configured to train on a HomePhoneline Networking Alliance 2.0 training sequence.

17. The method of claim 14, wherein the receiver is configured to train on an extended bandwidth HomePhoneline Networking Alliance training sequence.

18. The method of claim 14, wherein the training sequence has a spectrum that includes six copies of a spectrum of the 2 Mbaud signal.

19. The method of claim 14, wherein a first half of a spectrum of the training sequence spans a frequency range that matches a frequency range of a HomePhoneline Networking Alliance 2.0 specification.

* * * * *